US012613000B2

(12) United States Patent
Wikus

(10) Patent No.: US 12,613,000 B2
(45) Date of Patent: Apr. 28, 2026

(54) DEVICE AND METHOD FOR TRANSFERRING LIQUID HELIUM INTO AN APPLICATION CRYOSTAT

(71) Applicant: Bruker Switzerland AG, Fällanden (CH)

(72) Inventor: Patrick Wikus, Nürensdorf (CH)

( * ) Notice: Subject to any disclaimer, the term of this patent is extended or adjusted under 35 U.S.C. 154(b) by 52 days.

(21) Appl. No.: 18/985,383

(22) Filed: Dec. 18, 2024

(65) Prior Publication Data

US 2025/0198570 A1 Jun. 19, 2025

(30) Foreign Application Priority Data

Dec. 18, 2023 (DE) ..................... 10 2023 212 894.2

(51) Int. Cl.
*F17C 5/04* (2006.01)
*F17C 13/02* (2006.01)

(52) U.S. Cl.
CPC .............. *F17C 5/04* (2013.01); *F17C 13/025* (2013.01); *F17C 2221/017* (2013.01);
(Continued)

(58) Field of Classification Search
CPC ........ F17C 2221/017; F17C 2227/0304; F17C 2227/0353; F17C 13/006;
(Continued)

(56) References Cited

U.S. PATENT DOCUMENTS 3,195,620 A * 7/1965 Steinhardt, Jr. ......... F25B 9/004
165/104.19
3,330,125 A * 7/1967 Klipping ................. F17C 3/085
62/51.1

(Continued)

FOREIGN PATENT DOCUMENTS

DE 4039365 A1 6/1992
DE 69926087 T2 4/2006

(Continued)

OTHER PUBLICATIONS

NMR Magnet System UltraShield Magnets (English Version) User Manual, version 006 (Oct. 12, 2004), chapter 12, from Bruker BioSpin AG, Fällanden, Switzerland.

(Continued)

*Primary Examiner* — Christopher M Afful
(74) *Attorney, Agent, or Firm* — Benoît & Côté Inc.

(57) ABSTRACT

A device for transferring liquid helium into an application cryostat comprises a storage dewar, a transfer line with a first transfer line end in the storage dewar and a second transfer line end for insertion into the application cryostat. An apparatus is provided for generating a pressure difference between the storage dewar and the application cryostat. A condensation heat exchanger, cooled by a cryocooler, condenses helium gas to liquid helium for insertion into the application cryostat. A control apparatus, using a measure of gas pressure in the application cryostat provides a control output to the apparatus for generating a pressure difference such that a volume of liquid helium transferred through the transfer line per unit of time is approximately equal to the change in volume of the helium which condenses from helium gas to liquid helium per unit of time at the condensation heat exchanger.

22 Claims, 4 Drawing Sheets

(52) U.S. Cl.
CPC ................. *F17C 2227/0304* (2013.01); *F17C 2227/0353* (2013.01); *F17C 2227/04* (2013.01); *F17C 2250/043* (2013.01); *F17C 2250/0626* (2013.01)

(58) Field of Classification Search
CPC .... F17C 2203/0687; F17C 3/085; F17C 5/04; F17C 13/025; F17C 2227/04; F17C 2250/043; F17C 2250/0626; F25B 2400/17
USPC .......................................................... 141/82
See application file for complete search history.

(56) References Cited

U.S. PATENT DOCUMENTS

| | | | | |
|---|---|---|---|---|
| 6,442,948 | B1 * | 9/2002 | Takeda | F25D 19/00 62/48.2 |
| 8,375,742 | B2 | 2/2013 | Wang | |
| 8,671,698 | B2 | 3/2014 | Wang | |
| 2002/0002830 | A1 | 1/2002 | Strobel et al. | |
| 2007/0107445 | A1 | 5/2007 | Boesel et al. | |
| 2009/0301129 | A1 | 12/2009 | Wang | |
| 2021/0301979 | A1 | 9/2021 | Wikus | |
| 2022/0397311 | A1 | 12/2022 | Ito | |
| 2024/0093836 | A1 | 3/2024 | Wikus | |

FOREIGN PATENT DOCUMENTS

| | | | | |
|---|---|---|---|---|
| DE | 102020204186 | A1 | 9/2021 | |
| DE | 102021205423 | A1 | 12/2022 | |
| DE | 102022209941 | A1 | 3/2024 | |
| EP | 0245057 | B1 | 8/1990 | |
| EP | 0396624 | B1 | 12/1995 | |
| EP | 1197716 | A1 | 4/2002 | |
| JP | H04302404 | | 10/1992 | |
| JP | H06-185844 | A | 7/1994 | |
| JP | 2003-042396 | A | 2/2003 | |
| JP | 2008249201 | | 10/2008 | |
| JP | 2015124919 | | 7/2015 | |
| WO | WO-2011139989 | A2 * | 11/2011 | F25B 45/00 |

OTHER PUBLICATIONS

Kramer, D., "Helium is again short in supply", Physics Today, Apr. 4, 2022, American Institute of Physics.

Thermophysical Properties of Fluid Systems. Datasheet [online]. National Institute of Standards and Technology (NIST), U.S. Department of Commerce, 2023 [retrieved on Dec. 15, 2023]. Retrieved from the Internet: <URL: www.https://webbook.nist.gov/chemistry/fluid/>.

* cited by examiner 100
101
102
1
2
3
4
5
6
7/31
8
8a
9
9a
9b
10
11
12
13
14
15a
15b
16
17
18
19
19a
20
21
22
23
25
25a
26
27
28
29
30
31a
32
33
34
35
36
37

DEVICE AND METHOD FOR TRANSFERRING LIQUID HELIUM INTO AN APPLICATION CRYOSTAT

BACKGROUND OF THE INVENTION

Field of the Invention

The invention relates to a device for transferring liquid helium into an application cryostat, comprising:

a storage dewar for liquid helium, a transfer line for liquid helium for transferring liquid helium from the storage dewar into the application cryostat, comprising a first transfer line end arranged in the storage dewar and a second transfer line end for insertion into the application cryostat, and an apparatus for generating a pressure difference between the storage dewar and the application cryostat.

Description of the Related Art

A device of this kind has become known from the company publication "NMR Magnet System UltraShield Magnets (English Version) User Manual", version 006 (Oct. 12, 2004), chapter 12, from Bruker BioSpin AG, Fällanden, Switzerland.

Superconducting magnets, for example for NMR spectroscopy (NMR=nuclear magnetic resonance) or magnetic resonance imaging, also known as MRI, require cooling to ensure the superconducting state of the magnets. In many cases, the superconducting magnet is arranged in an application cryostat in which liquid helium is stored, typically at a temperature of about 4.2 K, which corresponds to the boiling point of liquid helium at atmospheric pressure. Performing cooling with liquid helium is also known from other areas of application.

Since the application cryostat cannot provide perfect thermal insulation, or heat is also introduced into the application cryostat by means of the relevant application, the liquid helium evaporates during operation. If the level of liquid helium in the application cryostat has dropped too low for continued operation, liquid helium is refilled into the application cryostat.

It should be noted here that helium is a scarce resource. Helium is a byproduct of natural gas production. The availability of helium on the world market is becoming increasingly limited, and the price of helium is rising; see D. Kramer, "Helium is again short in supply", Physics Today, Apr. 4, 2022, American Institute of Physics.

Therefore, efforts are being made to minimize the consumption of helium for operating application cryostats. Many consumers invest in helium recovery systems that can capture evaporating helium and reliquefy it.

A significant loss of helium occurs during the usual procedure of refilling liquid helium from a storage dewar into the application cryostat, as described in the above-mentioned company publication "NMR Magnet System UltraShield Magnets (English Version) User Manual." This usual procedure can be summarized as follows:

Step a) The storage dewar ("transportation dewar") is brought close to the application cryostat, in said company publication an NMR magnet, up to a distance of a few meters.

Step b) The warm transfer line is inserted into the transportation dewar, such that the (first) end of said line comes to lie below the liquid surface of the contained liquid helium.

Step c) Helium evaporates in the transportation dewar due to the heat input from the warm transfer line. This increases the pressure in the transportation dewar, and liquid helium is pushed into the transfer line which is cooled as a result. The helium which escapes from the end of the transfer line during the cooling process is usually not collected and is lost into the atmosphere. For a typical transfer line with a few meters length, some liters of liquid helium are required for cooling.

Step d) Once the helium that escapes from the (second) end of the line that faces away from the transportation dewar is sufficiently cold (i.e., the transfer line is sufficiently cooled), the transfer line is connected to the application cryostat (e.g., an NMR magnet), i.e., the second end is inserted into the application cryostat.

Step e) After the transfer line is connected to the application cryostat, liquid helium flows from the transportation dewar into the application cryostat. The mass flow is driven by the pressure difference which prevails between the transportation dewar and application cryostat. In the transportation dewar, an overpressure has been built up by inserting the transfer line as mentioned above. Usually, the pressure build-up in the transportation dewar, which is established due to the heat input when the transfer line is inserted, is not sufficient to transfer the desired amount of liquid helium. Therefore, helium gas is introduced from a compressed gas cylinder into the transportation dewar via a pressure regulator, such that the pressure in the transportation dewar is kept constantly high. Typically, the overpressure which is set in the transportation dewar is about 50-100 mbar. During the transfer of liquid helium, gaseous helium is pushed out of the application cryostat at an outlet at a rate corresponding to the volume of the liquid helium flowing in.

To clarify: At the beginning of the transfer of liquid helium into the application cryostat, the application cryostat or rather its helium tank is typically not empty, but rather still contains a small amount of liquid helium, and is otherwise filled with gaseous helium at a temperature of 4.2 K at a pressure of approximately 1 bar. When the helium tank slowly fills with liquid helium during the transfer, the cold gaseous helium which was located in the helium tank before the start of the transfer is successively pushed out of the helium tank and escapes via the outlet of the application cryostat.

Gaseous helium at 4.2 K and atmospheric pressure has a density of 16.5 g/l. Liquid helium at 4.2 K and atmospheric pressure has a density of 125 g/l. If, for example, 100 liters of liquid helium—i.e., 12.5 kg of helium—are transferred, 100 liters of gaseous helium—i.e., 1.65 kg—are thus pushed out of the application cryostat. This corresponds to 13.2 liters of liquid helium, or 13.2% of the transferred amount.

In most cases, this amount of helium simply escapes into the atmosphere via the outlet of the application cryostat, which is not sustainable and also increases the cost of operating the application cryostat.

Alternatively, it is possible, for example, to install a gas balloon reservoir that is dimensioned sufficiently large to collect the helium accumulating during helium transfer (the "transfer losses") at the outlet and feed it to a high-pressure reservoir or liquefier. In the line system that leads to the gas balloon and in the gas balloon itself, the gaseous helium warms up to room temperature, which leads to a large increase in the volume of the gas. 100 liters of gaseous helium at atmospheric pressure and 4.2 K correspond to approximately 10,000 liters (i.e., 10 $m^3$) at atmospheric pressure and room temperature.

During typical helium transfer into an NMR magnet, between 100 and 400 liters of liquid helium are transferred—depending on the type of magnet. A typical transfer takes approximately one hour. During this time, between 10 and 40 cubic meters of gaseous helium accumulate at room temperature, which must be stored in a gas balloon or processed by a recovery system (e.g., compressed in a pressure reservoir), corresponding to from 13 l/h to 50 l/h of liquid helium (or between about 1.6 and 6.6 kg of helium per hour). Correspondingly large gas balloons or powerful recovery systems take up a lot of space and are also very expensive.

In the subsequently published German patent application DE 10 2022 209 941 A1, it is proposed that during the transfer of liquid helium from the storage dewar to the application dewar, the gaseous helium pushed out at the application cryostat be fed to the storage dewar via a return line.

It should also be noted that it is also possible to actively cool application cryostats (e.g., containing superconducting magnets for NMR applications) in continuous operation using a cryocooler; see, for example, US 2002/0002830 A1. In this case, there is no need to refill liquid helium, and the problem of helium loss when refilling liquid helium is eliminated.

However, active cooling has several disadvantages compared to passive operation with a bath of liquid helium, in particular the introduction of vibrations by the cryocooler into the application cryostat, high energy consumption (approx. 8 kW in continuous operation), relatively high maintenance costs, and relatively long downtimes during maintenance activities. In the case of cryogen-free actively cooled superconducting magnets (i.e., superconducting magnets that do not have a buffer volume of liquid helium), there is also the very short time from a possible power failure to a breakdown of the superconductivity in the superconducting magnet ("time-to-quench").

U.S. Pat. No. 8,671,698 describes a helium reliquefier with a pulse tube refrigerator which is separate from the application cryostat.

A retrofittable reliquefier for helium has become known from US 2007/0107445 A1. Installing such a device is quite laborious. In addition, vibrations can also be introduced into the application cryostat in this case, and high energy and maintenance costs result.

U.S. Pat. No. 8,375,742 B2 describes a helium reliquefier that is equipped with its own insulation jacket. Helium evaporating from an application cryostat is liquefied by the reliquefier and returned via a transfer pipe which is also surrounded by the insulation jacket. In one variant, a connection for an external gas source is also provided.

US 2009/0301129 A1 describes a helium reliquefier for retrofitting to magnetic resonance systems, by means of which evaporating nitrogen and evaporating helium are to be reliquefied.

EP 0 245 057 B1 and EP 0 396 624 B1 disclose condensation heat exchangers which are connected to a cold head via a cooling circuit and which are inserted into a cryostat with liquid helium.

DE 10 2021 205 423 A1 also describes a device in which helium is purified and liquefied using a single cold head.

DE 40 39 365 A1 describes an NMR magnet having a cryostat in which supercooled liquid helium is arranged in a first, lower chamber, and liquid helium at atmospheric pressure and at 4.2 K is arranged in an upper, second chamber, a heat-insulating but pressure-permeable barrier being arranged between the chambers.

Thermophysical properties of various fluid systems, for example for helium, can be searched on the website: https://webbook.nist.gov/chemistry/fluid/. This website is operated by the National Institute of Standards and Technology (NIST), U.S. Department of Commerce.

A mobile liquefaction plant for liquefying helium has become known from DE 10 2020 204 186 A1. Said plant comprises a liquefaction apparatus for liquefying helium, an intermediate storage device for liquefied helium, a purifying apparatus for helium, and an additional collection apparatus for gaseous helium comprising a vessel having a flexible wall. By means of the liquefaction apparatus and the purifying apparatus, helium gas stored at the location of an application cryostat and evaporated during operation can be purified and liquefied and collected in the intermediate storage device. When filling the application cryostat with liquid helium from the intermediate storage device, evaporated helium gas can be collected by means of the additional collection apparatus.

DE 699 26 087 T2 describes a device for recondensing liquid helium, liquid helium being stored in a vessel. Gaseous helium evaporated in the vessel is led via a line to a cooling apparatus arranged outside the vessel and liquefied there. The liquefied helium is fed back into the vessel via another line.

SUMMARY OF THE INVENTION

The invention minimizes helium losses in a simple manner during a transfer of liquid helium from a storage dewar into an application cryostat. This is achieved according to the invention by a device of the type mentioned at the outset, which is characterized in that the device further comprises:

- a condensation heat exchanger for condensing helium gas to liquid helium, for insertion into the application cryostat,
- a cryocooler for cooling the condensation heat exchanger, and
- a control apparatus having at least one measuring input for a pressure sensor for measuring the gas pressure in the application cryostat and a control output for the apparatus for generating a pressure difference, the control apparatus being programmed to control the apparatus for generating a pressure difference such that a volume of liquid helium transferred through the transfer line per unit of time is approximately equal to the change in volume of the helium which condenses from helium gas to liquid helium per unit of time at the condensation heat exchanger.

The device according to the invention makes it possible to carry out in situ liquefaction of gaseous helium to liquid helium in the application cryostat during a transfer of liquid helium from the storage dewar into the application cryostat using the condensation heat exchanger, which is inserted into the application cryostat. The cooling capacity of the condensation heat exchanger (or rather the cryocooler) on the one hand and the transfer rate of liquid helium into the application cryostat on the other hand can be coordinated such that the change in volume (decrease in volume) of the helium which condenses per unit of time in the application cryostat corresponds at least substantially (and preferably exactly) to the volume of liquid helium which is transferred from the storage dewar through the transfer line into the application cryostat by means of the apparatus for generating a pressure difference ("state of equilibrium"). By setting and maintaining the state of equilibrium during the transfer of liquid helium, which is effected by the control apparatus, it is ensured that no (or only very little) gaseous helium is pushed out of the application cryostat by the inflowing liquid helium during the transfer of liquid helium. Accordingly, the need is eliminated to collect and process pushed-out gaseous helium for recovery. In particular, a large gas balloon for collecting the pushed-out gaseous helium is no longer required for the transfer of liquid helium.

The liquid helium is pushed through the transfer line into the application cryostat on account of the pressure difference between the storage dewar and the application cryostat, which is set using the apparatus for generating a pressure difference (a higher pressure being provided in the storage dewar than in the application cryostat, usually with a pressure difference of from 50 to 100 mbar). The apparatus for generating (or setting) a pressure difference is connected to the control output of the control apparatus and is controlled thereby. By increasing the pressure difference, the transfer rate of liquid helium can be increased, and by decreasing the pressure difference, the transfer rate of liquid helium can be decreased. It should be noted that, within the scope of the invention, the pressure difference as such does not need to be known. Nevertheless, it may be provided that the control apparatus also monitors the pressure in the storage dewar by means of an additional pressure sensor.

The (at least approximate) maintenance of the equilibrium may be ensured by keeping the pressure (helium gas pressure) in the application cryostat at least approximately constant, or at least within a predetermined pressure interval. Accordingly, the control apparatus typically uses the pressure in the application cryostat as an input variable (controlled variable) or at least as one of the input variables for actuating the apparatus for generating a pressure difference.

The apparatus for generating a pressure difference is typically designed to change the pressure (gas pressure) in the storage dewar, for example by changing the current of an electric heater in the storage dewar or by changing the position of a control valve (inlet valve) in a helium gas line from a helium gas reservoir (in particular a compressed helium gas reservoir) to the storage dewar. The cooling capacity of the condensation heat exchanger or rather the cooling capacity of the cryocooler thereof typically remains constant. However, alternatively or additionally, it is also possible to change the pressure in the application cryostat using an apparatus for generating a pressure difference, for example by changing the current of an electric heater in the application cryostat, or by changing the cooling capacity of the condensation heat exchanger.

The cryocooler generally comprises a cold head and a compressor. The cryocooler may, in particular, comprise a Gifford-McMahon cooler or also a pulse tube refrigerator. The cold head is thermally coupled to the condensation heat exchanger in order to cool same, such as via a cooling circuit. The cryocooler provides the cooling capacity required for the condensation of gaseous helium in the application cryostat.

If, for example, 100 liters of liquid helium are to be refilled into the application cryostat within the scope of the invention, a corresponding 100 liters of gaseous helium (which is at a temperature of 4.2 K) must be liquefied in the application cryostat during the transfer of the liquid helium in order to prevent helium gas from escaping from the application cryostat. The density of gaseous helium at 4.2 K and 1 bar is 16.5 g/I; accordingly, approximately 1.65 kg of helium must be liquefied. Helium has a latent heat of 20.6 kJ/kg and, accordingly, during the transfer of liquid helium, an energy of about 34 kJ at a temperature of 4.2 K must be absorbed by the cryocooler. For example, if a commercially available cryocooler with a cooling capacity of 2 watts is used therefor, this energy can be absorbed in about 4.7 hours. The transfer rate of liquid helium to be used within the scope of the invention is then approximately 21.3 I/h. In practice, the power to be absorbed will be slightly higher than the aforementioned 34 kJ since additional heat is introduced into the system, for example through the helium transfer line and the inserted condensation heat exchanger (e.g., arranged on a cooling rod). This will extend the transfer time or rather slightly reduce the transfer rate accordingly.

As can be seen from the above example, the time required for the transfer of liquid helium within the scope of the invention depends, in particular, on the amount of liquid helium to be refilled, on the cooling capacity of the cryocooler, and on additional heat inputs from incomplete insulation. Depending on the expected transfer time, the transfer of liquid helium can be planned, in particular also as an automated transfer "overnight" if no applications (e.g., NMR measurements) are to be carried out with the application cryostat anyway. Typical transfer times within the scope of the invention are 1 h to 16 h, and preferably 2 h to 12 h. It should be noted that the transfer time can be reduced if supercooled liquid helium is transferred from the storage dewar into the application cryostat (see also below).

The storage dewar is typically designed to be transportable ("transportation dewar"), such as with rollers, such that it can be moved back and forth between different laboratories and can then be used particularly easily for refilling a plurality of application cryostats. In one embodiment, the storage dewar is combined with the cryocooler to form an integrated transportable assembly (e.g., arranged on a common platform with rollers), in particular if the storage dewar is also used as a helium liquefier.

Typically (during the transfer of liquid helium through the transfer line), for the volume of liquid helium transferred through the transfer line per unit of time $dV(LHe_{trans})/dt$ and for the change in volume of the helium which condenses from helium gas to liquid helium per unit of time at the condensation heat exchanger $dV(He_{cond})/dt$, the following applies:

$|dV(Hecond)/dt| \geq 0.75 * |dV(LHe\ trans)/dt|$, preferably $|dV(Hecond)/dt| \geq 0.9 * |dV(LHetrans)/dt|$.

In addition, the following also typically applies:

$|dV(Hecond)/dt| \leq 1.25 * |dV(LHetrans)/dt|$, preferably $|dV(Hecond)/dt| \leq 1.1 * |dV(LHetrans)/dt|$.

In a particular embodiment of the device according to the invention, the control apparatus is programmed to keep the pressure in the application cryostat approximately constant during the transfer of liquid helium into the application cryostat. This makes it particularly easy to keep the transfer process in equilibrium, i.e., to proceed such that a volume of liquid helium transferred through the transfer line per unit of time is approximately equal to the change in volume of the helium which condenses from helium gas to liquid helium per unit of time at the condensation heat exchanger. Typically, the measured pressure in the application cryostat is regulated by the control apparatus to a predetermined, fixed target value. It should be noted that the target value should lie above the ambient atmospheric pressure (e.g., by 5 to 50 mbar) to avoid air being sucked into the application cryostat. Alternatively, it is also possible, for example, to adjust the measured pressure to a target value that is readjusted during the transfer, e.g., with a fixed difference with respect to the ambient atmospheric pressure.

Furthermore, an embodiment is provided in which the application cryostat is sealed against the outflow of gaseous helium, without damage to any safety apparatuses. This simplifies the setup of the overall system during the transfer of liquid helium, and no expensive helium is lost during the transfer process.

In an advantageous embodiment, it is provided that the control apparatus has a pressure sensor for measuring the ambient atmospheric pressure, and the control apparatus is programmed to keep the pressure in the application cryostat above an ambient atmospheric pressure at all times, in particular by appropriately actuating the apparatus for generating a pressure difference. This prevents air from being sucked into the application cryostat; sucking in air can lead to air components (e.g., moisture) freezing in the application cryostat and thus blocking the gas flow. The pressure can also be controlled directly in the application cryostat, e.g., by means of an electrical heater attached to the condensation heat exchanger or elsewhere in the application cryostat. In this way, in the event of a fault, the pressure in the application cryostat can be prevented from falling to an unacceptably low level (e.g., if the transfer line is frozen and completely blocked).

In a notable embodiment, the apparatus for generating a pressure difference comprises a control valve in a helium gas line, the helium gas line comprising a first helium gas line end connected to the storage dewar, and a second helium gas line end for connection to a helium gas reservoir, in particular a compressed helium gas reservoir. With the control valve for the helium gas reservoir, the pressure in the transportation dewar can be changed quickly and easily. The control valve can be operated and adjusted automatically by the control apparatus, e.g., with an electric motor. It should be noted that the helium to be introduced from the helium gas reservoir into the transportation dewar should be pre-purified such that impurities (e.g., water vapor or nitrogen) cannot enter the transportation dewar and the application cryostat and freeze there. The transportation dewar may be designed such that gaseous helium introduced from the helium gas reservoir can be liquefied therein, such as by means of the cold head of the cryocooler, which is also used to cool the condensation heat exchanger. A common cryocooler may be used to operate a cold trap to purify the helium gas and to liquefy the helium gas in the transportation dewar; for this purpose, in particular a device as described in DE 10 2021 205 423 A1 can be used.

In an advantageous embodiment, the apparatus for generating a pressure difference comprises an electric heater in the storage dewar. By heating with the electric heater in the storage dewar (or rather in the helium vessel thereof), stored liquid helium in the storage dewar is evaporated, which increases the pressure in the storage dewar, which can drive the transfer of the liquid helium. This approach is particularly simple.

In a particularly advantageous embodiment, the device further comprises:

a closed cooling circuit for a coolant, comprising a feed line from a cold head of the cryocooler to the condensation heat exchanger and a return line from the condensation heat exchanger to the cold head of the cryocooler, the cryocooler being designed to cool the coolant directly or indirectly by means of the cold head, in particular, the cold head of the cryocooler being arranged separately from the application cryostat. By setting up the cooling circuit, the location of the actual cold generation (at the cold head) can be easily spatially separated from the location of the helium condensation (at the condensation heat exchanger); the condensation heat exchanger can, in particular, be installed at the end of a rigid cooling rod which can be easily introduced into the application cryostat. The cold head does not need to be inserted into the application cryostat, which can save a lot of space on the application cryostat, and in many cases would not be possible anyway since the openings in application cryostats may be designed with very small cross-sections (significantly smaller than commercially available cold heads). Typically, the cold head is also arranged separately from the application cryostat, which simplifies the design of the overall system. In addition, the introduction of vibrations into the application cryostat can be minimized. A part of the feed line and of the return line, and if necessary also a part of the transfer line, can be integrated into the cooling rod. It should be noted that the cooling circuit usually also comprises a compressor feed line from a separate compressor to the cold head and a compressor return line from the cold head to the compressor.

In a particular development of this embodiment, the feed line, the return line, and the transfer line extend from the storage dewar as a line bundle in a common insulation vacuum. This design allows for easy insulation of the feed line, return line, and transfer line. The line bundle is particularly easy to handle, in particular the second transfer line end (outlet end) of the transfer line and the condensation heat exchanger (at the end of the feed line/beginning of the return line) can be particularly easily inserted together into the application cryostat. Usually, the line bundle is arranged in a rigid pipe ("cooling rod") in the rear region, i.e., near the second transfer line end of the transfer line and the condensation heat exchanger, which further simplifies handling.

A sub-variant of this development is also provided in which the feed line and the transfer line are thermally coupled to one another in the common insulation vacuum, in particular by means of a plurality of coupling bridges. This makes it possible to pre-cool the transfer line by means of the cooling circuit or rather by means of the coolant in the feed line before the start of the liquid helium transfer such that the helium transfer line is already cold when liquid helium flows through at the start of the transfer. This means that no liquid helium is consumed (i.e., evaporated) for cooling the transfer line.

Furthermore, in a notable embodiment, the device further comprises a helium gas reservoir which is connected to the storage dewar via a helium gas line, in particular the helium gas reservoir being a compressed helium gas reservoir. This makes it possible to introduce helium gas into the storage dewar, in particular to increase the pressure in the storage dewar (the helium reservoir is then usually a compressed helium gas reservoir) and/or to liquefy the introduced gaseous helium in the storage dewar (for which the cold head of the cryocooler typically projects into the storage dewar or rather the storage cryostat thereof; see also below).

An embodiment is particularly advantageous in which a cold head of the cryocooler and a helium vessel of the storage dewar are arranged in a common storage cryostat, the cold head of the cryocooler being designed to liquefy helium gas into liquid helium in the storage dewar. If helium can be liquefied in the storage dewar, liquid helium does not need to be transported to the location of the application cryostat over long distances (e.g., by truck), which would be technically complex, and therefore the cost of operating the application cryostat can be significantly reduced. Instead, gaseous helium, which is easier to transport, can be transported to the application cryostat (e.g., in compressed gas cylinders), and/or helium evaporating during normal operation of the application cryostat is liquefied in the application cryostat (typically after intermediate storage), which is particularly sustainable.

A further development of this embodiment is also advantageous in which the helium vessel and the cold head are designed to provide a liquid supercooled helium volume in the helium vessel. The supercooled helium has a temperature below the boiling point at the prevailing pressure in the helium vessel. Usually, the pressure in the helium vessel is approximately (but slightly above) 1 bar, corresponding to a boiling point of 4.2 K. The supercooled liquid helium then has a temperature of less than 4.2 K. The supercooled liquid helium in the helium vessel may have a temperature of 4.0 K or less, particularly preferably 3.8 K or less. However, the provision of supercooled liquid helium is more energetically demanding than the provision of liquid helium at the boiling point (4.2 K), with the energy demand increasing sharply as the temperature of the supercooled liquid helium decreases. Therefore, the supercooled liquid helium in the helium vessel may also have a temperature of 3.7 K or more. When supercooled liquid helium is fed into the application cryostat, additional cooling capacity is available for condensing gaseous helium into liquid helium in the application cryostat, corresponding to the temperature difference with respect to the boiling point and the specific heat capacity of the liquid helium. This allows for a faster transfer of the liquid helium than with liquid helium at the boiling point at a given cooling capacity of the cryocooler.

A sub-variant of this development is particularly advantageous in which a thermal barrier is arranged in the helium vessel, by means of which the supercooled helium volume below the thermal barrier is separated from a liquid saturated helium volume above the thermal barrier. With this setup, the provision of supercooled liquid helium can be carried out particularly efficiently and also comparatively easily. A thermal barrier that can be used in the context of this invention is described, for example, in DE 40 39 365 A1. The thermal barrier is heat-insulating but pressure-permeable. The cooling head of the cryocooler can be arranged in a separate vacuum chamber that protrudes through the thermal barrier, such that a coldest stage of the cold head can provide cooling capacity below the thermal barrier.

In a further sub-variant, it is provided that a feed line of a cooling circuit for coolant of the cryocooler extends through the region of the liquid supercooled helium volume. This means that a large reservoir of "cooling energy" at a temperature of less than 4.2 K is available for cooling the condensation heat exchanger. Due to the lower operating temperature, the heat transfer at the condensation heat exchanger can be made particularly efficient.

In a further sub-variant, the first transfer line end opens into the storage dewar in the region of the liquid supercooled helium volume, in particular near a base of the helium vessel. Accordingly, supercooled liquid helium can be easily conveyed into the application cryostat through the transfer line.

Another embodiment is advantageous in which the transfer line has a purge valve in the region near the first transfer line end. Air present in the transfer line can be blown out through the purge valve before the start of the liquid helium transfer. For this purpose, some gaseous helium is passed from the application cryostat, which is under a slight overpressure compared to the ambient atmosphere, through the transfer line and through the purge valve. This can minimize the ingress of air into the application cryostat. In the simplest case, the purge valve leads into the ambient atmosphere, or alternatively to a helium recovery system (which is equipped with a purifying function to separate air components).

Application Systems According to the Invention

An application system also falls within the scope of the present invention comprising a device according to the invention as described above, as well as an application cryostat, the transfer line and the condensation heat exchanger being inserted into the application cryostat, in particular into a common access pipe of the application cryostat. In the application system according to the invention, liquid helium can be transferred from the storage dewar into the application cryostat in a simple manner while helium losses can be minimized. If the condensation heat exchangers (typically arranged on a cooling rod) and the transfer line for the liquid helium use the same access pipe (in particular, the suspension pipe of an NMR magnet), a sufficiently large outflow cross-section can be easily provided in the event of a quench (sudden loss of superconductivity of the NMR magnet), namely at a second, unblocked access pipe (in particular, the suspension pipe). In addition, thermal coupling of the transfer line to a feed line for a coolant for the condensation heat exchanger can be easier.

An embodiment of the application system according to the invention is particularly advantageous in which the application cryostat contains a superconducting magnet coil, and an NMR probe head projects into a magnet bore of the magnet coil. The application cryostat can then be used for NMR measurements, and the costs for NMR measurements on samples can be reduced due to comparatively low operating costs within the scope of the invention. Typically, the NMR probe head projects into a room temperature bore of the application cryostat which is coaxial with the magnet bore.

Method According to the Invention for Transferring Liquid Helium

Also falling within the scope of the present invention is a method for transferring liquid helium into an application cryostat,

- in particular using a device according to the invention described above or an application system according to the invention described above,
- a transfer line for liquid helium being connected by a first transfer line end to a storage dewar containing liquid helium, and being inserted into the application cryostat by a second transfer line end,
- liquid helium being transferred from the storage dewar via the transfer line into the application cryostat,
- a flow of liquid helium through the transfer line being adjusted by means of an apparatus for changing a pressure difference between the storage dewar and the application cryostat,
- characterized in that
- a condensation heat exchanger, which is cooled by means of a cryocooler, is inserted into the application cryostat and liquefies gaseous helium to liquid helium in the application cryostat,
- and a control apparatus measures a pressure in the application cryostat and actuates the apparatus for changing a pressure difference such that a volume of liquid helium transferred through the transfer line per unit of time is approximately equal to the change in volume of the helium which condenses from helium gas to liquid helium per unit of time at the condensation heat exchanger. It is achieved within the scope of the method according to the invention that, when refilling liquid helium from the storage dewar, no or only a small amount of helium gas is pushed out of the application cryostat by the inflowing liquid helium. This is achieved by liquefying helium gas present in the application cryostat using the condensation heat exchanger when filling liquid helium into the application cryostat such that the associated volumes/changes in volume approximately match one another ("state of equilibrium"). Accordingly, little or no helium gas is lost during the transfer of the liquid helium. Any helium recovery system for storing and reliquefying the pushed-out helium gas is not necessary or can be designed to be comparatively small and cost-effective.

A variant of the method according to the invention is particularly advantageous in which the control apparatus keeps the pressure in the application cryostat approximately constant during the transfer of liquid helium into the application cryostat. By means of this approach, it is easy to make the volume of liquid helium transferred through the transfer line per unit of time approximately equal to the change in volume of the helium which condenses from helium gas to liquid helium per unit of time at the condensation heat exchanger ("state of equilibrium").

In a particular variant, no outflow of gaseous helium from the application cryostat occurs during the transfer of liquid helium. This makes it possible to completely eliminate helium losses during the liquid helium transfer without the need for a helium recovery system.

A variant is also advantageous which provides that the control apparatus measures an ambient atmospheric pressure, and the control apparatus keeps the pressure in the application cryostat above the ambient atmospheric pressure at all times, in particular by appropriately actuating the apparatus for generating a pressure difference. This prevents air from the environment from being sucked into the application cryostat. If the pressure in the application cryostat is at risk of falling too low, the transfer of liquid helium into the application cryostat is usually increased (by increasing the pressure in the storage dewar); if necessary (e.g., if the transfer line is blocked), an electric heater in the application cryostat can be switched on and/or turned up, if available.

In one variant, it is provided that the control apparatus, as the apparatus for changing a pressure difference, actuates a control valve in a helium gas line which leads from a helium gas reservoir, in particular a compressed helium gas reservoir, to the storage dewar. This allows the pressure in the storage dewar to be increased directly and quickly in order to start or increase the transfer of liquid helium.

A variant is also advantageous in which the control apparatus, as the apparatus for changing a pressure difference, actuates an electric heater in the storage dewar. An electric heater is easy and inexpensive to install. The heater can evaporate helium in the storage dewar, which increases the gas pressure in the storage dewar. A compressed helium gas reservoir is not required (but can still be provided).

A variant is also provided in which a coolant is guided in a closed cooling circuit through a feed line from a cold head of the cryocooler to the condensation heat exchanger and through a return line back to the cooling head of the cryocooler, the cold head of the cryocooler cooling the coolant directly or indirectly, in particular the cold head being arranged separately from the application cryostat. With the cooling circuit, the cold head can be spatially separated from the condensation heat exchanger, which saves installation space in the application cryostat (in particular in the region of the access pipes). In addition, the cold head can easily be used for other purposes, in particular for liquefying helium in the storage dewar.

A variant is particularly advantageous in which the transfer line between the storage dewar and the application cryostat is thermally coupled to the feed line. This allows the transfer line for the liquid helium to be cooled by means of the cooling circuit.

A further development of this variant provides that before the start of a transfer of liquid helium through the transfer line, the transfer line is first pre-cooled by means of the coolant in the feed line. When liquid helium is first passed through the transfer line for a transfer, the transfer line is already cold and no or only a small amount of liquid helium evaporates on the way to the application cryostat. This can save liquid helium.

Another variant provides:

that a cold head of the cryocooler and a helium vessel of the storage dewar are arranged in a common storage cryostat, and that before the start of the transfer of liquid helium, gaseous helium from a helium gas reservoir, in particular a compressed helium gas reservoir, is supplied to the storage dewar, and gaseous helium is condensed to liquid helium in the storage dewar by means of the cold head. In this variant, liquid helium can be generated on site in the storage dewar, and complex and difficult transportation of liquid helium to the point of use can be avoided. If necessary, helium can be processed in a virtually closed circuit at the point of use, which is sustainable and cost-effective.

A variant is particularly advantageous that provides that a liquid supercooled helium volume is provided in a helium vessel of the storage dewar, and the liquid helium transferred through the transfer line is drawn from the liquid supercooled helium volume. The supercooled helium volume provides additional cooling capacity in the application cryostat, which supports liquefaction of helium gas in the application cryostat, and the transfer of liquid helium can be carried out particularly quickly.

A further development of the aforementioned variant is advantageous that provides that the condensation heat exchanger is cooled by means of a coolant that circulates in a closed cooling circuit, and the coolant is guided in a feed line through the region of the liquid supercooled helium volume. This allows for a particularly large reservoir of cooling energy at a temperature$<$4.2 K to be used for liquefaction in the application cryostat. The condensation heat exchanger is highly efficient and powerful.

A variant is also advantageous in which, before starting a transfer of liquid helium, the transfer line is first purged with gaseous helium from the application cryostat by means of a purge valve which is arranged near the first transfer line end in the transfer line. This minimizes the ingress of contaminants (air components) into the application cryostat. The branch to the purge valve is typically located in the region of the storage dewar. Typically, more than ¾ of the length of the transfer line can be purged by means of the purge valve.

A variant is also provided in which the application cryostat is used alternately in normal operation for an application and is filled with liquid helium in a refill operation, the condensation heat exchanger and the second transfer line end not being inserted into the application cryostat during normal operation, and the condensation heat exchanger and the second transfer line end being inserted into the application cryostat during the refill operation. The condensation heat exchanger and the transfer line are only inserted when they are needed. Heat input into the application cryostat during normal operation can thus be minimized.

A further development of the above-mentioned variant provides that a superconducting magnet coil is arranged in the application cryostat, and during normal operation as an application with an NMR probe head, NMR measurements are carried out on samples that are arranged in a magnet bore of the superconducting magnet coil. Sustainable and cost-effective NMR measurements of the samples are possible within the scope of the invention.

Further advantages of the invention are found in the description and the drawing. Likewise, the features mentioned above and those detailed below can be used according to the invention individually or collectively in any combination. The embodiments shown and described are not to be understood as an exhaustive list, but rather have an exemplary character for the description of the invention.

DETAILED DESCRIPTION

Figure 1:
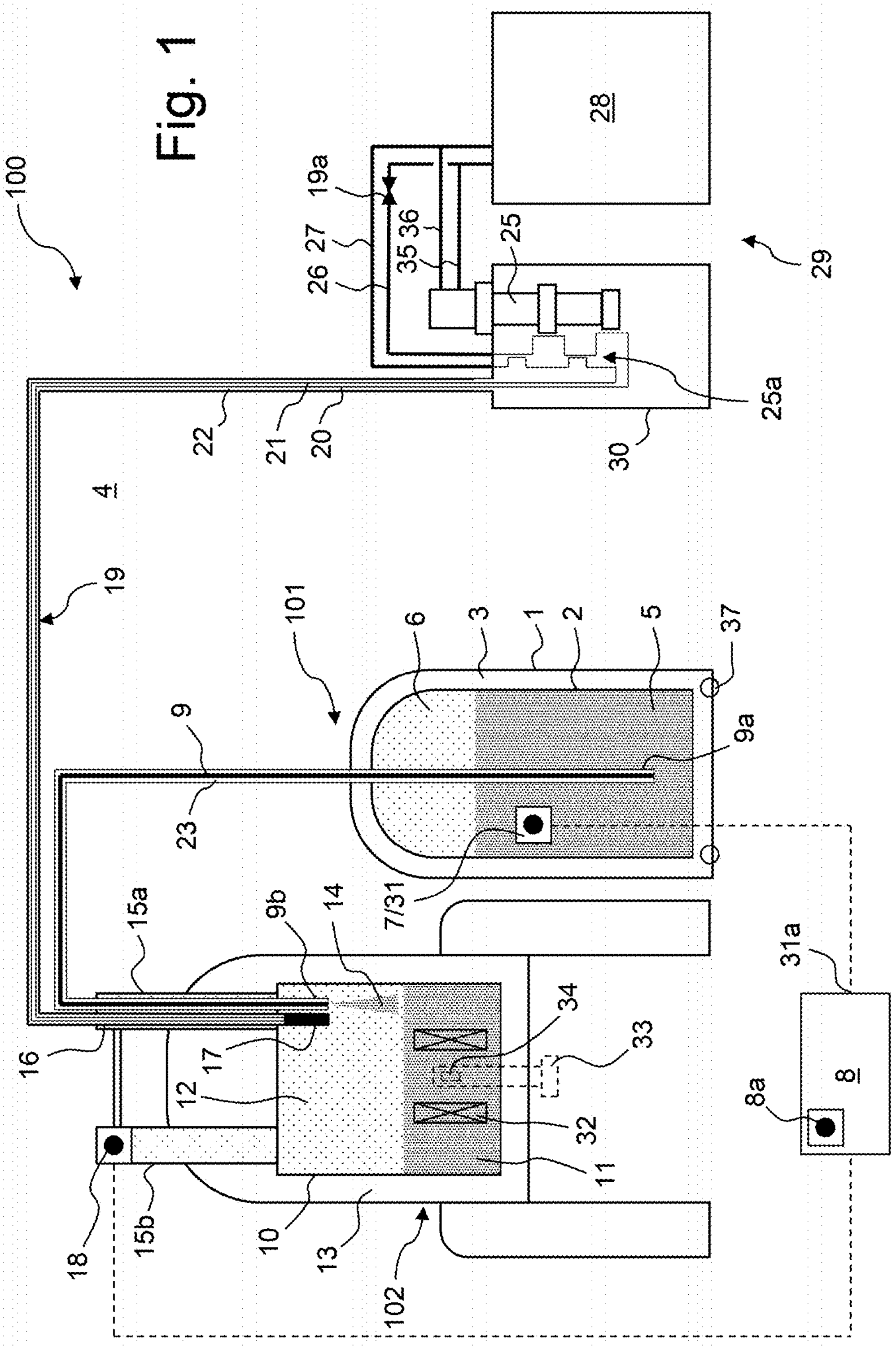
FIG. 1 shows a schematic view of a first embodiment of an application system according to the invention, comprising a device according to the invention for transferring liquid helium and also an application cryostat, a cryocooler having a separate cryocooler cryostat.

FIG. 1 schematically shows a first embodiment of an application system 100 according to the invention, comprising a device 101 for transferring liquid helium and an application cryostat 102, during a transfer of liquid helium.

The device 101 comprises a storage dewar 1 having a helium vessel 2 which is thermally decoupled from the environment 4 by means of an insulation vacuum 3. Here, room temperature (20° C.) and an atmospheric pressure $p_{atm}$ of 1.00 bar prevail in the environment 4. One or more radiation shields or multi-layer superinsulation can be provided in the insulation vacuum 3 (not shown in detail).

In the helium vessel 2, liquid helium 5 is stored in a lower region, and gaseous helium 6 is above the liquid helium 5 in an upper region. In the shown embodiment, the liquid helium 5 and the gaseous helium 6 in the storage dewar 1 have a temperature of approximately 4.2 K, and in this case, a pressure $p_{vorrat}$ of approx. 1.08 bar prevails in the storage dewar 1. In the shown embodiment, an electric heater 7 is also arranged in the storage dewar 1, which can be controlled by means of an electronic control apparatus 8.

A transfer line 9 for liquid helium projects into the storage dewar 1. A first transfer line end 9*a* opens into the liquid helium 5 near the base of the helium vessel 2. The transfer line 9 is provided with vacuum insulation 23. The storage dewar 1 is designed to be transportable, in this case by means of rollers 37 ("transportation dewar").

A second transfer line end 9*b* of the transfer line 9 is inserted into the application cryostat 102 through an access pipe 15*a* and opens into a helium tank 10 of the application cryostat 102. The helium tank 10 is thermally insulated from the environment 4 by an insulation vacuum 13. One or more radiation shields can be provided in the insulation vacuum 13 (not shown in detail).

In the helium tank 10 of the application cryostat 102, liquid helium 11 is located in a lower region, and gaseous helium 12 is located in an upper region. In the shown embodiment, the liquid helium 11 and the gaseous helium 12 in the helium tank 10 in each case have a temperature of approximately 4.2 K, and a pressure $p_{anwend}$ of approx. 1.03 bar prevails in the helium tank.

The pressures (for the transfer of liquid helium through the transfer line 9) are generally $p_{atm}<p_{anwend}<p_{vorrat}$.

Since the pressure $p_{vorrat}$ prevailing in the storage dewar 1 is somewhat higher than the pressure $p_{anwend}$ prevailing in the application cryostat 102, liquid helium 5 is pushed out of the storage dewar 1 through the transfer line 9 and into the application cryostat 102; cf. the liquid helium 14 flowing out at the second transfer line end 9*b*. Driven by a pressure difference between the storage dewar 1 and the application cryostat 102, liquid helium is therefore transferred from the storage dewar 1 into the application cryostat 102.

Not only the transfer line 9, but also a cooling rod 16 extend through the access pipe 15*a* into the application cryostat 102; the access pipe 15*a* is therefore also referred to as the common access pipe 15*a*. A condensation heat exchanger 17 is formed at a lower end of the cooling rod 16. The condensation heat exchanger 17 continuously liquefies gaseous helium 12 in the helium tank 10 during the transfer of liquid helium.

The condensation heat exchanger 17 is cooled by means of a coolant which circulates in a cooling circuit 19. The cooling circuit 19 extends with a feed line 20 from a cold head heat exchanger 25*a* on a cold head 25 to the condensation heat exchanger 17, and with a return line 21 from the condensation heat exchanger 17 back to the cold head heat exchanger 25*a* on the cold head 25. End regions of the feed line 20 and return line 21 close to the condensation heat exchanger 17 extend in the cooling rod 16. The feed line 20 and the return line 21 are surrounded by vacuum insulation 22. The coolant circuit 19 is driven by a compressor 28, a compressor feed line 26 extending from the compressor to the cold head heat exchanger 25*a* or to the feed line 20, and a compressor return line 27 extending from the return line 21 or from the cold head heat exchanger 25*a* to the compressor 28. The coolant in the cooling circuit 19 can, in particular, be helium. The cold head 25 and the compressor 28 form the cryocooler 29 of the device 101.

The compressor 28 in this case operates the cold head 25, separate cold head lines 35, 36 being installed between the compressor 28 and the cold head 25, and also ensures the coolant circulation in the cooling circuit 19 of the condensation heat exchanger 17. This is particularly cost-effective. The cooling circuit 19 can be activated and deactivated separately by means of the cooling circuit valve 19*a*, in this case arranged in the compressor feed line 26.

In this case, the cold head 25 and the cold head heat exchanger 25*a* are arranged in a cryocooler cryostat 30 which is separate from the application cryostat 102 and from the storage dewar 1. The cryocooler 29 can, in particular, be constructed as a Gifford-McMahon refrigerator or pulse tube refrigerator. The cooling of the cooling rod 16 or the condensation heat exchanger 17 is installed with a cryocooler 29 or a refrigeration machine outside the application cryostat 102.

The control apparatus 8 monitors the pressure $p_{anwend}$ in the application cryostat 102 using a pressure sensor 18, which is in this case arranged on a second access pipe 15*b* of the application cryostat 102. Furthermore, the second access pipe 15*b* is free and can in particular serve effectively as an emergency outlet for helium gas (e.g., in case of quenching). The pressure sensor 18 is connected to the control apparatus 8 at a measuring input 18*a*. Furthermore, in the shown embodiment, the control apparatus 8 monitors the pressure $p_{atm}$ in the environment 4 using a pressure sensor 8*a* integrated in the control apparatus 8.

In the shown embodiment, the control apparatus 8 controls the heating capacity of the electric heater 7 in the storage dewar 1 when the transfer of liquid helium is being carried out. The pressure in the storage dewar 1 and thus also the pressure difference between the storage dewar 1 and the application cryostat 102 can be changed via the heating capacity of the heater 7. The heater 7 thus constitutes an apparatus 31 for generating a pressure difference between the storage dewar 1 and the application cryostat 102. The heater 7 is connected to a control output 31*a* of the control apparatus 8.

The heating capacity is adjusted and readjusted by the control apparatus 8 such that the pressure $p_{anwend}$ in the application cryostat 102 is regulated to a specified target value $p_{anwend}^{soll}$. The specified target value $p_{anwend}^{soll}$ is 1.03 bar in this case and is chosen such that it is slightly above (in this case by 0.03 bar) the pressure $p_{atm}$ in the environment 4. In the simplest case, the specified target value $p_{anwend}^{soll}$ is constant throughout the entire duration of the liquid helium transfer. Should the weather, and thus the air pressure in the environment 4 or the pressure $p_{atm}$ monitored by means of the sensor 8*a* change significantly during the transfer, the specified target value $p_{anwend}^{soll}$ can also be changed if required in order for a desired difference (minimum difference and/or maximum difference) to remain between the pressure $p_{anwend}$ in the application cryostat 102 and the pressure $p_{atm}$ in the environment, in particular in order to avoid sucking ambient air into the application cryostat 102 and/or to prevent the triggering of overpressure safety devices (pressure relief valves, rupture disks, not shown in detail) in the application cryostat 102.

If, during the introduction of liquid helium into the application cryostat 102 through the transfer line 9, the pressure $p_{anwend}$ remains substantially at $p_{anwend}^{soll}$, then the volume of liquid helium introduced per unit of time dV(LHe trans)/dt substantially corresponds to the change in volume of the helium dV($He_{cond}$)/dt which condenses per unit of time in the condensation heat exchanger 17 ("state of equilibrium"). In this case, no gaseous helium escapes from the application cryostat 102 during the introduction of the liquid helium into the application cryostat 102.

If the pressure $p_{anwend}$ falls below $p_{anwend}^{soll}$, the control apparatus 8 increases the heating capacity of the heater 7 such that additional helium is evaporated in the storage dewar 1, the pressure $p_{vorrat}$ in the storage dewar increases, the flow of liquid helium through the transfer line 9 is increased, and the gas pressure in the application cryostat 102 increases. If the pressure $p_{anwend}$ rises above $p_{anwend}^{soll}$, the control apparatus 8 reduces the heating capacity of the heater 7 or switches it off completely, such that less or no helium is evaporated in the storage dewar 1, the pressure in the storage dewar 1 drops (also as a result of the subsequent discharge of liquid helium 5), the flow of liquid helium through the transfer line 9 is reduced, and the gas pressure in the application cryostat 102 drops.

In the shown embodiment, the cooling capacity of the cryocooler 29 is kept constant during the transfer of liquid helium.

In the shown embodiment, a superconducting magnet coil 32 (also referred to as magnet for short) is arranged in the application cryostat 102. In normal operation, an NMR probe head 33 projects into a room temperature bore (not shown in detail) of the application cryostat 102, such that a measurement sample 34 can be subjected to an NMR measurement in the magnetic field of the magnet 32 in the magnet bore thereof. It should be noted that, in normal operation, the transfer line 9 and the cooling rod 16 are pulled out of the access pipe 15*a*, and only in refill operation are the transfer line 9 and the cooling rod 16 inserted into the access pipe 15*a* (the latter being shown in FIG. 1).

Fill level sensors can also be provided in the application cryostat 102 and in the storage dewar 1, which sensors are read by the control apparatus 8 (not shown in more detail).

Figure 2:
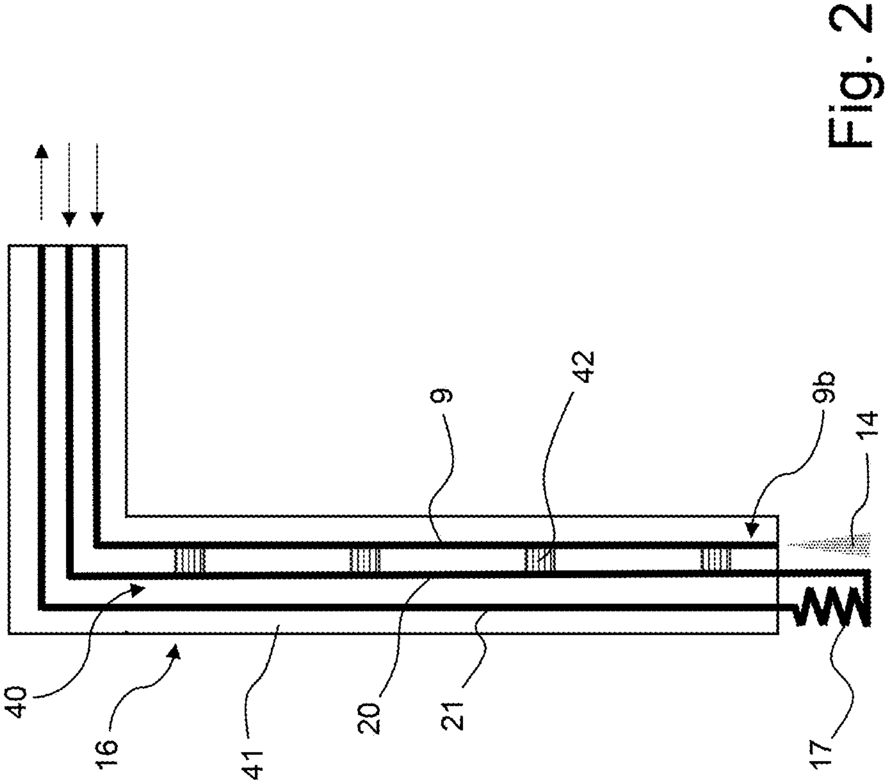
FIG. 2 shows a line bundle consisting of a transfer line, feed line, and return line for the invention.
Figure 3:
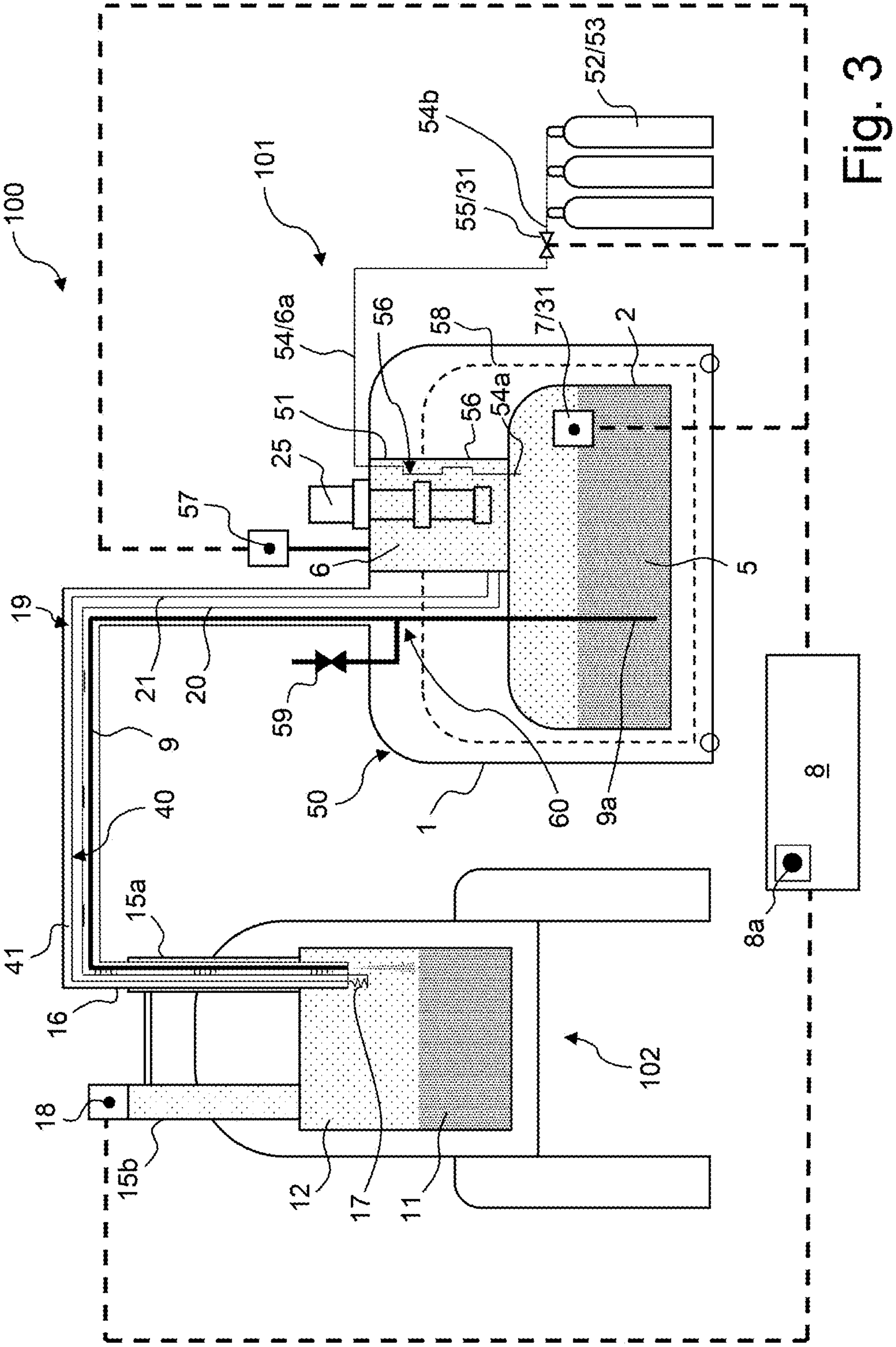
FIG. 3 shows a schematic view of a second embodiment of an application system according to the invention, comprising a device according to the invention for transferring liquid helium as well as an application cryostat, a cold head of the cryocooler and a helium vessel of the storage dewar being arranged in a common storage cryostat.

FIG. 2 illustrates a rear portion of a line bundle 40 which can be used within the scope of the invention on a device according to the invention for the transfer of liquid helium (see also FIG. 3).

The feed line 20 and the return line 21 of the cooling circuit for the condensation heat exchanger 17 as well as the transfer line 9 for the liquid helium 14, which flows out into the application cryostat at the second transfer line end 9*b*, extend in the line bundle 40. The line bundle 40 forms a common insulation vacuum 41 for the lines 9, 20, 21. A plurality of coupling bridges 42 consisting of material having good thermal conductivity, for example high-purity copper, are installed between the transfer line 9 and the feed line 20, by means of which coupling bridges a thermal coupling is established between the feed line 20 and the transfer line 9. This makes it possible, in particular, to pre-cool the transfer line 9 by means of the feed line 20 before the start of the transfer of liquid helium.

In this case, the vertically extending part of the line bundle 40 forms an easy-to-handle cooling rod 16. It should be noted that the line bundle beyond the cooling rod is preferably designed to be flexible. The line bundle can have so-called superinsulation. In addition, spacers having low thermal conductivity are provided to keep the lines at a distance from the outer insulation sheath.

FIG. 3 schematically shows a second embodiment of an application system 100 according to the invention, comprising a device 101 for transferring liquid helium and an application cryostat 102. The application system 100 largely corresponds to the application system of FIG. 1, and therefore only the essential differences are explained below. For the sake of simplicity, the compressor and parts of the lines carrying the coolant are not shown in detail in FIG. 3.

In the embodiment of FIG. 3, a common storage cryostat 50 is installed, in which both the cold head 25 and the helium vessel 2 are arranged. The cold head 25 is arranged in a receiving region 51, which is open towards the helium vessel 2, such that the gaseous helium 6 is distributed in the upper part of the helium vessel 2 and in the receiving region 51. The storage cryostat 50 in this case has a radiation shield 58 which is thermally coupled to a warmer cooling stage of the cold head 25 (coupling not shown in detail).

A helium gas line 54 leads from a helium gas reservoir 52, which is designed as a compressed helium gas reservoir 53, into the storage dewar 1. A first helium gas line end 54*a* projects into the upper part of the helium vessel 2, and a second helium gas line end 54*b* is connected to the compressed helium gas reservoir 53. The compressed helium gas reservoir 53 can be designed to be transportable, for example by means of rollers (not shown in detail).

Near the second helium gas line end 54*b*, the helium gas line 54 has a control valve 55 which can be automatically actuated by the control apparatus 8, in this case by means of an electric motor (not shown in detail).

The helium gas line 54 leads through the receiving region 51 past the cold head 25 and is thermally coupled to the two cold stages of the cold head 25 by means of a helium supply heat exchanger 56. Helium gas 6*a* flowing into the storage dewar 1 through the helium gas line 54 (or helium gas 6 already present in the storage dewar 1) can be liquefied by means of the cold head 25.

It should be noted that the helium gas 6*a* should be purified before liquefaction, for example by means of a cold trap (not shown in detail); for example, the device described in DE 10 2021 205 423 A1 can be used in this case.

In the shown embodiment, a pressure sensor 57 is also provided, by means of which a pressure $p_{vorrat}$ in the storage dewar 1 is measured and monitored by the control apparatus 8; the control apparatus 8 ensures that $p_{vorrat}$ is above $p_{atm}$ at all times (see also below), which prevents ambient air from being sucked into the storage dewar 1. In addition, the control apparatus 8 also monitors the pressure $p_{anwend}$ in the application cryostat 102 by means of the pressure sensor 18. Furthermore, the control apparatus 8 can actuate the heater 7 in the storage dewar 1.

The control apparatus 8 can use the heater 7 (see above) or also the control valve 55 in each case as the apparatus 31 for generating a pressure difference between the storage dewar 1 and the application cryostat 102. By increasing the opening cross-section of the control valve 55, additional helium (helium gas and/or liquefied helium) can be introduced into the storage dewar 1, which increases the pressure $p_{vorrat}$ in the storage dewar 1. By reducing the opening cross-section of the control valve 55 or closing the control valve 55 (with subsequent discharge of liquid helium through the transfer line 9 into the application cryostat), the pressure $p_{vorrat}$ in the storage dewar 1 can be lowered.

The feed line 20, the return line 21, and the transfer line 9 extend in this case between the storage dewar 1 and the application cryostat 102 as a line bundle 40 in a common vacuum insulation 41 (cf. FIG. 2). In addition, the transfer line 9 has a branch 60 to a purge valve 59 near its first transfer line end 9*a*, the branch 60 being located in this case within the common storage cryostat 50. The purge valve 59 can be used to purge the transfer line 9 between the second transfer line end 9*b* and the branch 60 with helium gas 12 (which originates from the application cryostat 102), which takes place before the start of the transfer of liquid helium through the transfer line 9; it should be noted that $p_{anwend} > p_{atm}$ for this purpose. In order to completely eliminate helium losses, the outlet of the purge valve 59 can be connected to a helium recovery system; the air that is purged into the helium recovery system can be separated in an upstream cold trap during the reliquefaction of the helium from the recovery system (helium recovery system and cold trap not shown in detail).

Procedure According to the Invention

In the following, the procedure of refilling liquid helium from the storage dewar 1 into the application cryostat 102 within the scope of a method according to the invention will be explained by way of example. The exemplary procedure can take place, in particular, in an application system 100 as shown in FIG. 3. Steps 2 to 6 can be assigned to transfer operation, and step 7 to normal operation of the application cryostat 102. Step 1 can take place in parallel with normal operation or as part of transfer operation.

Step 1) Helium gas is fed from the compressed helium gas reservoir 53 via the helium line 54 to the storage dewar 1, said helium gas being liquefied by the cold head 25. Liquid helium 5 collects in the helium vessel 2.

Step 2) As soon as the liquefaction is completed (e.g., because the helium vessel 2 is full or the compressed helium gas reservoir 53 is empty), it is possible to prepare for the transfer of the liquid helium 5. To do this, the user first inserts the cooling rod 16 with the transfer line 9 and the condensation heat exchanger 17 into the application cryostat 102 into the access pipe 15*a*.

Step 3) The purge valve 59 is opened, and helium gas from the application cryostat 102 pushes air through the purge valve 59 out of the transfer line 9. When the air present has escaped, the purge valve 59 is closed.

Step 4) Then, the cooling circuit valve (ref. sign 19*a* in FIG. 1) is opened for the coolant, whereby some of the gas stream supplied by the compressor (ref. sign 28 in FIG. 1) is diverted, and the circulation of the coolant in the cooling circuit 19 or rather through the condensation heat exchanger 17 is activated. Since the feed line 20 is thermally connected to the transfer line 9, the transfer line 9 cools down in the process.

Once the condensation heat exchanger 17 and the transfer line 9 are cold, the transfer of liquid helium ("helium transfer") is started. This can either happen automatically when the pressure in the helium tank 10 of the application cryostat 102 drops due to the onset of condensation, or the pressure in the storage dewar 1 is actively increased, e.g., by means of the heater 7 or by means of supplied helium gas 6*a* from the compressed helium gas reservoir 53.

Step 5) The helium transfer is then controlled by the control apparatus 8 such that the transfer rate of the liquid helium through the transfer line 9 corresponds to the rate at which gaseous helium 12 condenses in the application cryostat 102, such that no helium gas 12 escapes from the application cryostat 102 during the helium transfer. Accordingly, the helium transfer can be carried out according to the invention such that no storage balloon is required for carrying out the helium transfer without losses.

Step 6) Once the helium transfer is completed (e.g., because the application cryostat 102 is completely filled with liquid helium 11 or the liquid helium 5 in the storage dewar 1 is exhausted), the user removes the cooling rod 16 with the transfer line 9 and the condensation heat exchanger 17 from the application cryostat 102.

Step 7) Then, using the application cryostat 102, and in particular the NMR magnet (ref. sign 32 in FIG. 1) contained in the application cryostat 102, NMR measurements can be continued only a few hours after the start of the helium transfer. Compared to a conventional helium transfer with escape of gaseous helium through one of the access pipes 15*a*, 15*b*, the stabilization of the application cryostat 102 within the scope of the invention takes place significantly faster, since no large quantities of cold gas have escaped through the access pipes (suspension pipes) 15*a*, 15*b* (the latter usually leads to a significant cooling of the access pipes during a conventional helium transfer, and during the return to thermal equilibrium, the magnetic field is unstable).

Figure 4:
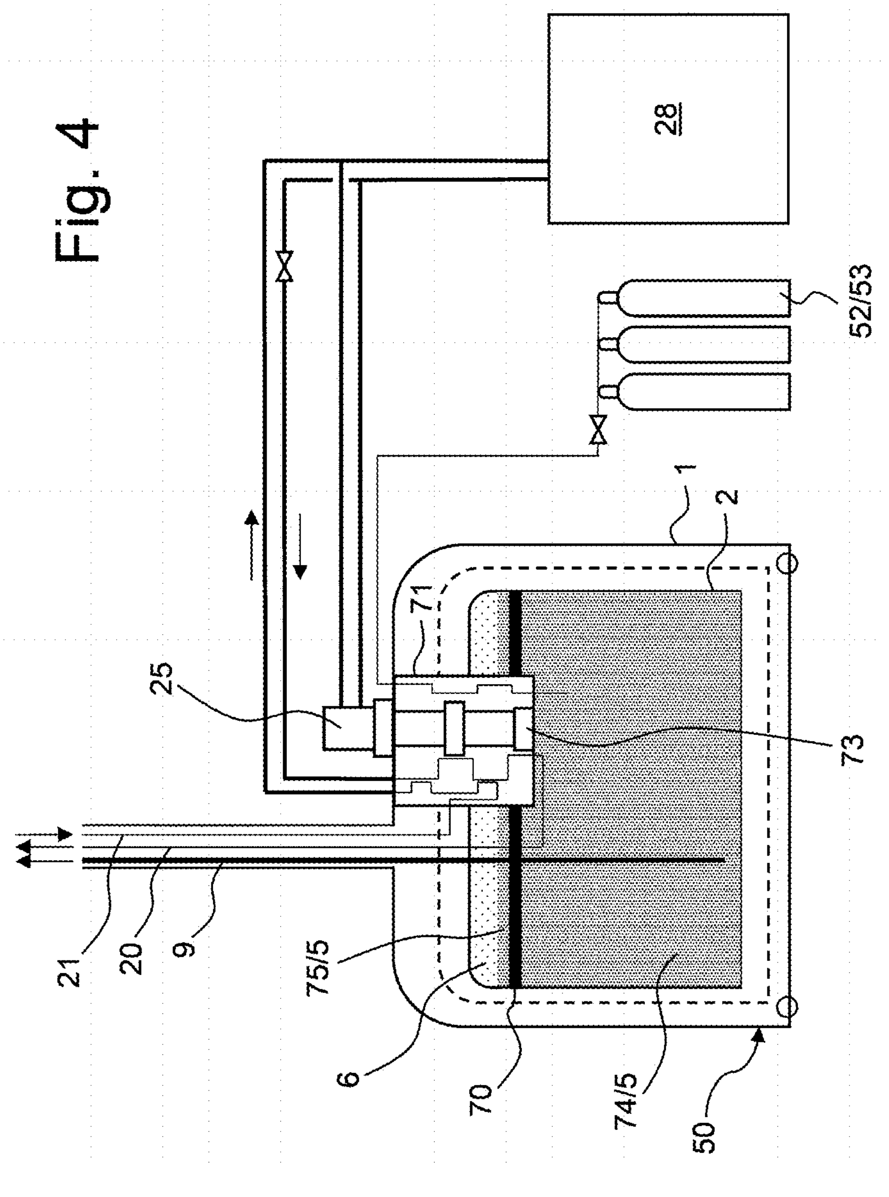
FIG. 4 shows a design for the storage dewar for a device according to the invention for transferring liquid helium, having a thermal barrier in the helium vessel of the storage dewar.

FIG. 4 shows an alternative design of the storage dewar 1 for the invention, which can be used, for example, in the embodiment of the application system of FIG. 3. Only the main differences with respect to the design of FIG. 3 will be explained.

In the design shown in FIG. 4, a thermal barrier 70 is arranged in the helium vessel 2 of the storage dewar 1. The thermal barrier 70 is pressure-permeable (i.e., liquid helium can flow through), but thermally insulating. The thermal barrier 70 can be designed, in particular, as described in DE 40 39 365 A1.

The cold head 25 is arranged in a closed vacuum vessel 71, the vacuum vessel 71 extending beyond (below) the thermal barrier 70. The lowest (coldest) cooling stage 73 of the cold head 25 can thus cool the liquid helium 74 below the thermal barrier 70. Said liquid helium 74 below the thermal barrier 70 is supercooled and has a temperature of about 3.7 K. The supercooled liquid helium 74 is also referred to as a whole as a supercooled liquid helium volume 74. There is saturated liquid helium 75 above the thermal barrier 70 that is at a temperature of approximately 4.2 K; the saturated liquid helium 75 is also referred to as a whole as the saturated liquid helium volume 75. The gaseous helium 6 thereabove also has a temperature of about 4.2 K and is at the pressure $p_{vorrat}$ of approx. 1.08 bar.

The transfer line (pipe) 9 extends deep into the region of the supercooled liquid helium 74 until just before the base of the helium vessel 2. In the portion in which the transfer line 9 leads through the region of the saturated helium volume 75, the transfer line 9 is thermally insulated from the saturated helium volume 75 (not shown in detail). Accordingly, during the helium transfer, supercooled liquid helium 74 is conveyed through the transfer line 9 into the application cryostat.

The supercooled liquid helium 74 that is conveyed into the application cryostat can extract heat energy from the application cryostat when the supercooled liquid helium warms up again to 4.2 K. Less cooling capacity must then be applied to the condensation heat exchanger in order to condense gaseous helium in the condensation heat exchanger. For example, if 100 l of liquid helium (12.5 kg) with a temperature of 3.7 K are transferred, approximately 26.3 kJ of additional cooling energy are available which can be used for the approximately 34 kJ required for the condensation heat (see above). However, the lower the temperature of the supercooled liquid helium 74, the more energy-intensive the provision of supercooled liquid helium 74 becomes.

The feed line 20 of the cooling circuit for the condensation heat exchanger in the application cryostat extends through the region of the supercooled liquid helium 74. Accordingly, the coolant can be used to transport heat energy from the condensation heat exchanger in a particularly efficient manner.

It should be noted that supercooled helium for the invention can also result, for example, by expanding helium in a throttle at a low pressure (not shown in detail).

In summary, the invention relates to a device (101) for transferring liquid helium (14) into an application cryostat (102), comprising a storage dewar (1), a transfer line (9) comprising a first transfer line end (9*a*) in the storage dewar (1) and a second transfer line end (9*b*) for insertion into an application cryostat (102), an apparatus (31) for generating a pressure difference between the storage dewar (1) and the application cryostat (102), characterized by a condensation heat exchanger (17) for condensing helium gas (12) to liquid helium (11), for insertion into the application cryostat (102), a cryocooler (29) for cooling the condensation heat exchanger (17), and a control apparatus (8), having a measuring input (18*a*) for a pressure sensor (18) for measuring the gas pressure in the application cryostat (102) and a control output (31*a*) for the apparatus (31) for generating a pressure difference, the control apparatus (8) being programmed to control the apparatus (31) for generating a pressure difference such that a volume of liquid helium (14) transferred through the transfer line (9) per unit of time is approximately equal to the change in volume of the helium which condenses from helium gas (12) to liquid helium (11) per unit of time at the condensation heat exchanger (17). The device makes it easy to minimize helium losses during the transfer of liquid helium.

LIST OF REFERENCE SIGNS

1 Storage dewar
2 Helium vessel
3 Insulation vacuum (at the storage dewar)
4 Environment/surrounding atmosphere
5 Liquid helium (in the storage dewar)
6 Gaseous helium (in the storage dewar)
6*a* Gaseous helium (from the helium gas reservoir)
7 Electric heater (in the storage dewar)
8 Electronic control apparatus
8*a* Pressure sensor for the surrounding atmosphere
9 Transfer line for liquid helium
9*a* First transfer line end (inserted into the storage dewar)
9*b* Second transfer line end (inserted into the application cryostat)
10 Helium tank
11 Liquid helium (in the application cryostat)
12 Gaseous helium (in the application cryostat)
13 Insulation vacuum (at the application cryostat)
14 (Outflowing/transferred) liquid helium
15*a* First/common access pipe
15*b* Second access pipe
16 Cooling rod
17 Condensation heat exchanger
18 Pressure sensor for application cryostat
18*a* Measuring input (for pressure sensor 18)
19 Cooling circuit
19*a* Cooling circuit valve
20 Feed line for coolant
21 Return line for coolant
22 Vacuum insulation (feed line and return line)
23 Vacuum insulation (transfer line)
25 Cold head
25*a* Cold head heat exchanger (for cooling circuit)
26 Compressor feed line
27 Compressor return line
28 Compressor
29 Cryocooler
30 Cryocooler cryostat
31 Apparatus for generating a pressure difference
31*a* Control output (for apparatus 31)
32 Superconducting magnet coil/magnet
33 NMR probe head
34 Measurement sample
35, 36 Cold head lines
37 Rollers
40 Line bundle
41 Common insulation vacuum
42 Coupling bridges
50 Common storage cryostat
51 Receiving region

52 Helium gas reservoir
53 Compressed helium gas reservoir
54 Helium gas line
54*a* First helium gas line end
54*b* Second helium gas line end
55 Control valve
56 Helium supply heat exchanger
57 Pressure sensor for storage dewar
58 Radiation shield
59 Purge valve
60 Branch for purge valve
70 Thermal barrier
71 Vacuum vessel
73 Lowest/coldest cooling stage
74 Supercooled liquid helium/helium volume
75 Saturated liquid helium/helium volume
100 Application system
101 Device for transferring liquid helium
102 Application cryostat

The invention claimed is:

1. A device for transferring liquid helium into an application cryostat, comprising:

a storage dewar for liquid helium, a transfer line for liquid helium for transferring liquid helium from the storage dewar into the application cryostat, comprising a first transfer line end arranged in the storage dewar and a second transfer line end for insertion into the application cryostat, an apparatus for generating a pressure difference between the storage dewar and the application cryostat, a condensation heat exchanger for condensing helium gas to liquid helium, for insertion into the application cryostat, a cryocooler for cooling the condensation heat exchanger, and a control apparatus having at least one measuring input from a cryostat pressure sensor for measuring a gas pressure in the application cryostat and a control output to the apparatus for generating a pressure difference, the control apparatus being programmed to control the apparatus for generating a pressure difference such that a volume of liquid helium transferred through the transfer line per unit of time is approximately equal to a change in volume of the helium which condenses from helium gas to liquid helium per unit of time at the condensation heat exchanger.

2. The device according to claim 1, wherein the control apparatus is programmed to keep the pressure ($p_{anwend}$) in the application cryostat approximately constant during the transfer of liquid helium into the application cryostat.

3. The device according to claim 1, wherein the control apparatus has an ambient pressure sensor for measuring the ambient atmospheric pressure ($p_{atm}$), and is programmed to keep the pressure ($p_{anwend}$) in the application cryostat above an ambient atmospheric pressure ($p_{atm}$) at all times.

4. The device according to claim 1, wherein the apparatus for generating a pressure difference comprises a control valve in a helium gas line, with the helium gas line comprising a first helium gas line end connected to the storage dewar, and a second helium gas line end for connection to a helium gas reservoir.

5. The device according to claim 1, wherein the apparatus for generating a pressure difference comprises an electric heater in the storage dewar.

6. The device according to claim 1, wherein the device further comprises a closed cooling circuit for a coolant, comprising a feed line from a cold head of the cryocooler to the condensation heat exchanger and a return line from the condensation heat exchanger to the cold head of the cryocooler, the cryocooler being designed to cool the coolant directly or indirectly by means of the cold head.

7. The device according to claim 6, wherein the feed line, the return line, and the transfer line extend from the storage dewar as a line bundle in a common insulation vacuum.

8. The device according to claim 1, wherein the device further comprises a helium gas reservoir which is connected to the storage dewar via a helium gas line.

9. The device according to claim 1, wherein a cold head of the cryocooler and a helium vessel of the storage dewar are arranged in a common storage cryostat, the cold head of the cryocooler being designed to liquefy helium gas into liquid helium in the storage dewar.

10. The device according to claim 9, wherein the helium vessel and the cold head are designed to provide a liquid supercooled helium volume in the helium vessel.

11. The device according to claim 10, wherein a thermal barrier is arranged in the helium vessel, by means of which thermal barrier the supercooled helium volume below the thermal barrier is separated from a liquid saturated helium volume above the thermal barrier.

12. An application system comprising a device according to claim 1 and an application cryostat, wherein the transfer line and the condensation heat exchanger are inserted into the application cryostat, and wherein the application cryostat contains a superconducting magnet coil, and an NMR probe head projects into a magnet bore of the magnet coil.

13. A method for transferring liquid helium into an application cryostat using a device according to claim 1, wherein a transfer line for liquid helium is connected by a first transfer line end to a storage dewar containing liquid helium, and is inserted into the application cryostat by a second transfer line end, wherein liquid helium is transferred from the storage dewar via the transfer line into the application cryostat, wherein a flow of liquid helium through the transfer line is adjusted by means of an apparatus for changing a pressure difference between the storage dewar and the application cryostat, wherein a condensation heat exchanger, which is cooled by means of a cryocooler, is inserted into the application cryostat and liquefies gaseous helium to liquid helium in the application cryostat, and wherein a control apparatus measures a pressure ($p_{anwend}$) in the application cryostat and actuates the apparatus for changing a pressure difference such that a volume of liquid helium transferred through the transfer line per unit of time is approximately equal to the change in volume of the helium which condenses from helium gas to liquid helium per unit of time at the condensation heat exchanger.

14. The method according to claim 13, wherein the control apparatus keeps the pressure ($p_{anwend}$) in the application cryostat approximately constant during the transfer of liquid helium into the application cryostat.

15. The method according to claim 13, wherein no outflow of gaseous helium from the application cryostat occurs during the transfer of liquid helium.

16. The method according to claim 13, wherein the control apparatus measures an ambient atmospheric pressure ($p_{atm}$) and the control apparatus keeps the pressure ($p_{anwend}$) in the application cryostat above the ambient atmospheric pressure ($p_{atm}$) at all times.

17. The method according to claim 13, wherein the control apparatus, as the apparatus for changing a pressure difference, actuates a control valve in a helium gas line which leads from a helium gas reservoir to the storage dewar, and/or actuates an electric heater in the storage dewar.

18. The method according to claim 13, wherein a coolant is guided in a closed cooling circuit through a feed line from a cold head of the cryocooler to the condensation heat exchanger and through a return line back to the cooling head of the cryocooler, the cold head of the cryocooler cooling the coolant directly or indirectly.

19. The method according to claim 18, wherein the transfer line between the storage dewar and the application cryostat is thermally coupled to the feed line, and before the start of a transfer of liquid helium through the transfer line, the transfer line is first pre-cooled by means of the coolant in the feed line.

20. The method according to claim 13, wherein a cold head of the cryocooler and a helium vessel of the storage dewar are arranged in a common storage cryostat, and before the start of the transfer of liquid helium, gaseous helium from a helium gas reservoir is fed to the storage dewar and gaseous helium is condensed into liquid helium in the storage dewar by means of the cold head.

21. The method according to claim 13, wherein a liquid supercooled helium volume is provided in a helium vessel of the storage dewar, and the liquid helium transferred through the transfer line is drawn from the liquid supercooled helium volume.

22. The method according to claim 13, wherein the application cryostat is alternately used in normal operation for an application and is filled with liquid helium in a refill operation, wherein the condensation heat exchanger and the second transfer line end are not inserted into the application cryostat during normal operation, and are inserted into the application cryostat during a refill operation, and wherein a superconducting magnet coil is arranged in the application cryostat, and during normal operation as an application with an NMR probe head, NMR measurements are carried out on samples which are arranged in a magnet bore of the superconducting magnet coil.

* * * * *